(12) United States Patent
Kanai et al.

(10) Patent No.: US 6,246,653 B1
(45) Date of Patent: Jun. 12, 2001

(54) DATA SLICE CIRCUIT AND DATA SLICE METHOD

(75) Inventors: Toshio Kanai, Moriyama; Takeo Yasuda, Yasu-gun; Kazuhiro Tsuruta, Sagamihara; Wataru Ichihara, Kusatsu, all of (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/209,789

(22) Filed: Dec. 11, 1998

(30) Foreign Application Priority Data

Dec. 12, 1997 (JP) .................................................. 9-342363

(51) Int. Cl.$^7$ ........................................................ G11B 7/00
(52) U.S. Cl. ................................... 369/59.17; 369/124.15
(58) Field of Search .................................. 369/47, 48, 49, 369/50, 54, 58, 59, 124, 44.34; 360/45, 46, 48, 51, 53

(56) References Cited

U.S. PATENT DOCUMENTS 5,165,089 * 11/1992 Jacquette et al. ...................... 369/59

5,588,011 * 12/1996 Riggle ................................ 360/46 X

FOREIGN PATENT DOCUMENTS 63-193377  8/1988 (JP) .
6-333082   5/1993 (JP) .

* cited by examiner

Primary Examiner—Muhammad Edun
(74) Attorney, Agent, or Firm—G. Marlin Knight; Ron Feece

(57) ABSTRACT

A method and apparatus for reducing the effect of inter-wave interference on signals read from a storage medium and to precisely digitize the read signals are described. An apparatus for digitizing a signal read from a storage medium according to an embodiment of the invention, comprises: a peak detector, for detecting a peak value for an amplitude of a signal read from the storage medium; a threshold value determiner, for employing the peak value obtained by the peak detector to determine a compensation value that is used for compensating for the effect of inter-wave interference on the signal, and for employing the threshold value calculated by the conventional method and the compensation value to determine a compensated threshold value; and a digitization circuit, for digitizing the signal by using the threshold value determined by the threshold value determiner. Optionally an interpolator may be used to obtain more accurate peak values which occur between sample points.

21 Claims, 3 Drawing Sheets

○ : SAMPLING POINT    △ : INTERPOLATION POINT

US 6,246,653 B1

DATA SLICE CIRCUIT AND DATA SLICE METHOD

BACKGROUND OF THE INVENTION

1. Field of the Invention

The present invention relates to digitization of signals read from a recording medium, and more particularly, to data slicing circuitry and data slicing method used in digitizing a signal read from a recording medium, such as an optical disk.

2. Description of Related Art

As a storage medium for storing information such as data, image and sound, optical disks, such as compact disks (CDs), magneto-optical disks (MOs) and digital video disks (DVDs), have been developed and their capacities are increasing.

Since data bits are stored at a high density on an optical disk having a large recording capacity, a signal read from the optical disk tends to be affected by so-called "inter-symbol interference." The inter-symbol interference, also called "inter-wave interference," is such a phenomenon that read signals interfere with signals read for adjacent data and the read signals are changed from the ideal waveforms.

The effect of inter-wave interference is particularly distinctive, for example, when data is a combination of "3T" (shortest data)–"8T" (longest data) patterns in "2–7" code, for example. That is, as is shown in FIG. 1, if long data such as "8T" are present and adjacent read waveform for the "3T" pattern is reduced from waveform 10 to waveform 11 by inter-wave interference. In other words, the effect of inter-wave interference varies depending on how the data patterns are combined.

As a result, when the signal is digitized by a so-called "PWM" system for digitizing signals based on pulse width, as is shown in FIG. 1 the pulse width digitized using threshold value 12 is decreased from T1 to T0. In some cases, the signals can not be digitized because the pulse width is too narrow. Or in other words, reproduction of the signals is impossible.

Variation in the effect provided by inter-wave interference depends not only on how the data patterns are combined, but also on other factors, such as the reflectivity of an optical system and of an optical disk used for signal reading. There are two types of DVDs that are employed as data recording mediums: a DVD-ROM used specifically for read-only, and a rewritable DVD-RAM. A DVD-ROM has a smaller modulation ratio A (=Hmin/Hmax), which is defined as a ratio of the amplitude (Hmin) of the shortest data to the amplitude (Hmax) of the longest data, than does a CD-ROM; and a DVD-RAM has a greater change in light reflectivity than does a CD-ROM. As a result, both the DVD-ROM and the DVD-RAM tend to be affected by the inter-symbol interference more easily than is the CD-ROM.

A phase compensator for compensating for the effect of the inter-wave interference is disclosed in Japanese Unexamined Patent Publication No. Hei 6-333082. However, this device defines in advance a compensation value for a pulse width in accordance with a data bit pattern, and compensates for a pulse width of a digitally read signal by an amount that is the equivalent to the compensation value. Therefore, the conventional device merely compensates mechanically for the pulse width, in accordance with the data bit pattern, and does not determine a compensation-value by monitoring an actual read signal when compensating for the effect of the inter-wave interference, resulting in the precision of the signal digitization being low.

SUMMARY OF THE INVENTION

It is, therefore, one object of the present invention to provide facilitating means and a method for reducing the effect of inter-wave interference on signals read from a storage medium, and for precisely digitizing the read signals.

It is another object of the present invention to provide facilitating means and a method for reducing the occurrence of data bit errors during the reading of stored data.

According to the present invention, a data slicing circuit (100), for digitizing a signal read from a data storage medium, comprises: a peak detector (26), for detecting a peak value of an amplitude of a signal read from the storage medium; a threshold value determiner (28), for employing the peak value obtained by the peak detector to determine a compensation value that is used for compensating for the effect of interwave interference on the signal, and for employing the threshold value calculated by the conventional method and the compensation value to determine a compensated threshold value; and a digitization circuit (32), for digitizing the signal by using the threshold value determined by the threshold value determiner.

Furthermore, according to the present invention, a data slice method, for digitizing a signal read from a data storage medium, comprises the steps of: detecting a peak value of an amplitude of a signal read from the storage medium; employing the peak value to determine a compensation value, which is used for compensating for the effect on the signal of inter-wave interference, and employing the threshold value calculated by the conventional method and the compensation value to determine a compensated threshold value; and digitizing the signal by using the determined threshold value.

In addition, provided is an optical disk device (200) that employs a novel data slicing circuit (100).

DETAILED DESCRIPTION OF A PREFERRED EMBODIMENT

Figure 2:
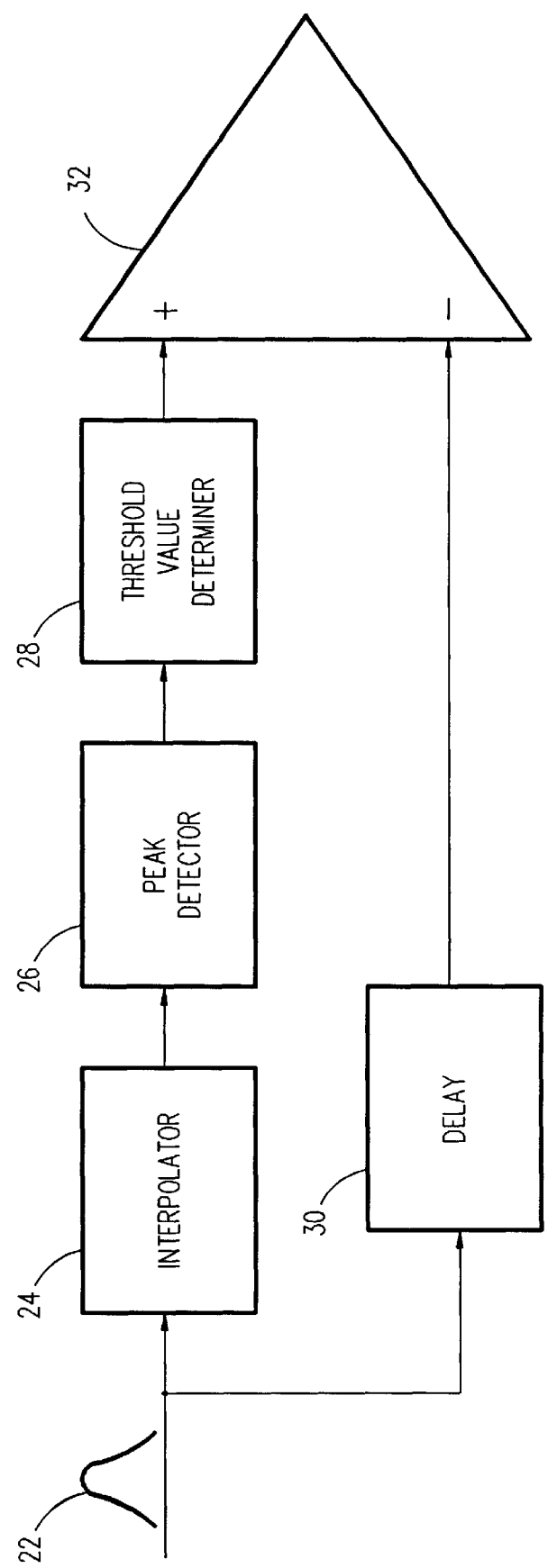
FIG. 2 is a diagram illustrating the arrangement of a data slicing circuit according to one embodiment of the present invention.

FIG. 2 is a diagram illustrating the arrangement of a data slicing circuit according to one embodiment of the present invention.

In FIG. 2, a data slicing circuit 100 comprises an interpolator 24 for receiving a signal 22 read from a storage medium; a peak detector 26, a threshold value determiner 28, a delay circuit 30 and a comparator 32. The interpolator 24 is not always required for the implementation of the present invention.

Figure 3:
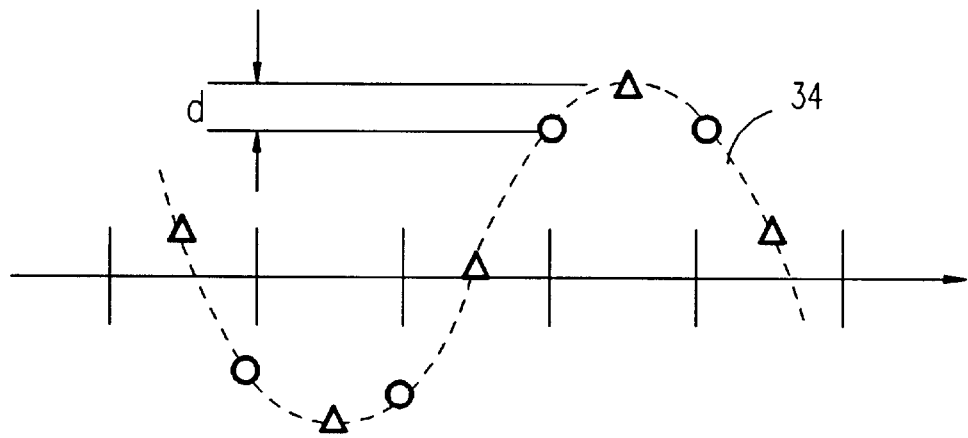
FIG. 3 is a diagram illustrating one example interpolation method performed by an interpolator according to the present invention.

As is shown in FIG. 3, the interpolator 24 is required for the acquisition of interpolation points (Δ) for a read signal 34 that is to be sampled at sampling points (o), for the performance of precise sampling (to acquire an approximation value) for the read signal 34, and for increasing the precision of the calculation performance by the peak detector 26 at the following stage whereat the peak value for the amplitude is calculated. That is, in FIG. 3, when interpolation is performed by the interpolator 24, the peak value of the amplitude of a read signal can be calculated more precisely using the equivalent of the length "d" than when the interpolator 24 is not used for interpolation. It is preferable that the function be employed to enhance the precision of the calculation of the peak value. For the interpolation in FIG. 3, interpolation points are acquired by using an approximation expression.

The peak detector 26 acquires a peak value for the amplitude of the read signal that is obtained by sampling. When the interpolator 24 is not employed, the peak value for the amplitude of the read signal that is sampled is produced by using only the sampling points (o). When the interpolator 24 is employed, as is described above, the peak value for the amplitude of a signal waveform is calculated after interpolation is performed.

The threshold value determiner 28 determines a compensation value to be used for employing the peak value obtained by the peak detector 26 to compensate for the effect on the read signal of inter-wave interference, and then determines a threshold value, which is required for the digitization of the read signal, based on the peak value and the compensation value. Specifically, a new threshold value Vth for digitization is acquired by the expression $$Vth=Vt+\Delta Vt \quad (1)$$

where Vt denotes a threshold value before compensation (current threshold value), and ΔVt denotes a compensation value for compensating for the inter-symbol interference.

The determination of the compensation value ΔVt is performed using the following two methods.

The first method is a compensation method used when a change in the peak value for the amplitude of a read signal corresponds to a change in the threshold value used for digitization, which is especially a problem on a DVD-RAM that has a large modulation ratio A (=Hmin/Hmax), defined as a ratio of the amplitude (Hmin) of the shortest data to the amplitude (Hmax) of the longest data, i.e., that has a small change in amplitude in accordance with the data length. With this method, the changed value for the peak value of the amplitude is employed as a compensation value.

In this case, compensation value ΔVt is acquired by expression $$\Delta Vt=k^{*}(Vp-Vpp) \quad (2)$$

where Vp denotes a current peak value, Vpp denotes an immediately preceding peak value, and k denotes a proportional constant determined according to the magnitude of the inter-wave interference.

The second method is used to compensate for a reduction, due to inter-wave interference, in the read signal for short data, where short data, such as a 3T pattern, are adjacent to long data, such as an 8T pattern, in 2–7 code, which is especially a problem for a DVD-ROM. In this case, since the modulation ratio A is small, i.e., since the change in the amplitude corresponding to the data length is large, the change in the peak value for the amplitude of a read signal does not correspond to the change in the threshold value for digitization. Therefore, the fluctuation value of the peak value for the amplitude can not be determined as being the compensation value, as it is for the first method. Instead, according to the second method, when the change in the amplitude is monitored and the amplitude for short data is detected, the compensation value for the threshold value used for digitation is determined in order to extend the data length, and the compensation value is employed to determine the threshold value.

In this case, compensation value ΔVt is acquired by expression $$\Delta Vt=k^{*}(Vc-Vt) \quad (3)$$

where Vc denotes a middle value obtained from the peak value, Vc denotes a threshold value before compensation (current threshold value), and k denotes a proportional constant determined in accordance with the magnitude of the inter-wave interference.

Figure 4:
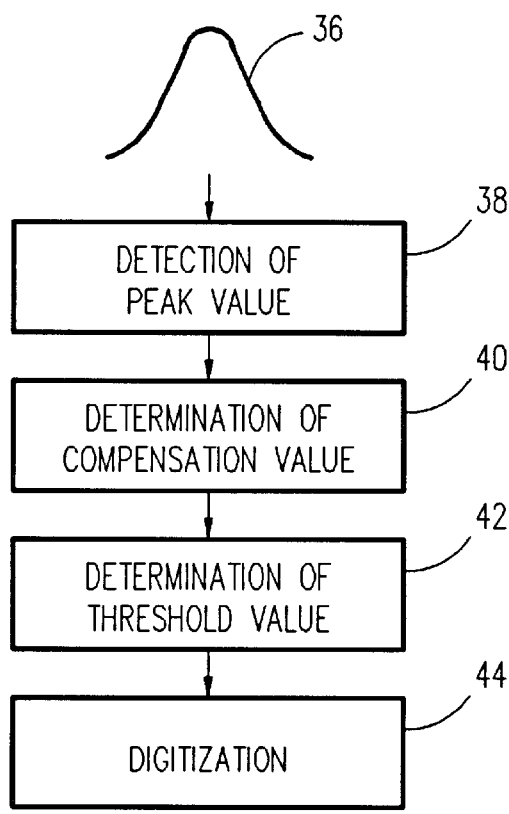
FIG. 4 is a flowchart showing a data slice method according to the present invention.

FIG. 4 is a flowchart showing a data slice method according to the present invention. This method is employed by the data slicing circuit of the present invention described above.

At step 38, a peak value is detected for the amplitude of a signal 36 read from a storage medium. At step 40 a compensation value, based on the detected peak value, is determined that is used to compensate for the inter-wave interference provided by the read signal. At step 42, the threshold value calculated by the conventional method and the compensation value that have been determined are employed to determine a threshold value that is required for the digitization of the read signal. At step 44, the digitization of the read signal 36 is performed based on the threshold value.

Although not shown in the flowchart in FIG. 4, a step of determining an interpolation value used to compensate the signal read from the storage medium can be inserted before step 38.

Figure 1:
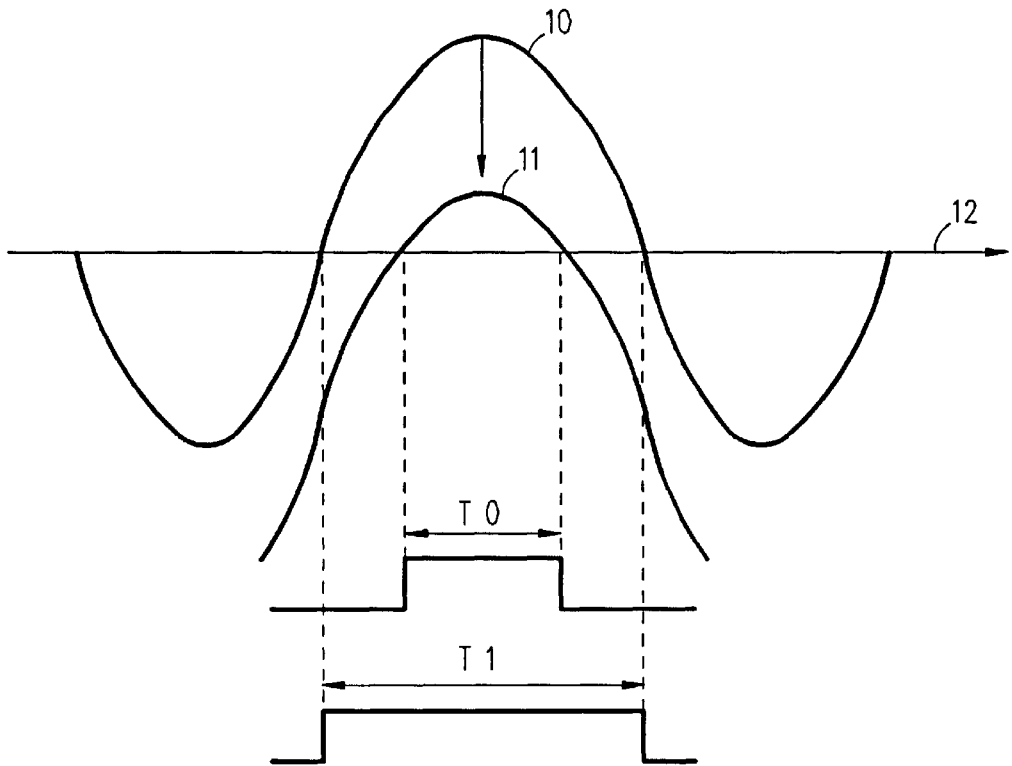
FIG. 1 is a diagram for explaining the effect of inter-wave interference in the prior art.
Figure 5:
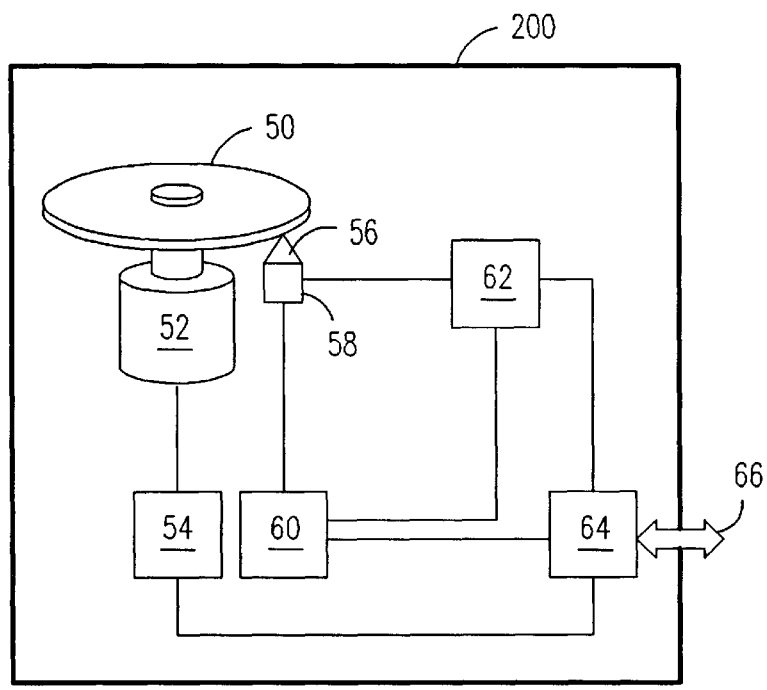
FIG. 5 is a diagram illustrating an optical disk device incorporating the data slicing circuit of the present invention.

FIG. 5 is a diagram illustrating an optical disk device incorporating the data slicing circuit 100 of the present invention. An optical disk device 200 comprises: an optical disk 50; a spindle motor 52 for rotating the optical disk 50; a rotation controller 54 for controlling the rotation of the spindle motor 52; an optical pickup 58 for irradiating the optical disk 50 with an optical beam 56 and for receiving the reflected beam; an optical pickup controller 60 for controlling the optical pickup 58; a signal processor 62 for processing signals acquired from the optical pickup 58; and a drive controller 64 for controlling the three circuits 54, 60 and 62 and for exchanging a data signal 66 with an external device.

The data slicing circuit 100 in FIG. 2 is included in the signal processor 62 of the optical disk device 200 in FIG. 5. Specifically, the data slicing circuit 100 in the signal processor 62 detects the peak value for the amplitude of the signal read from the storage medium by the optical pickup 58; employs the peak value to determine the compensation value for compensating for the effect on the read signal of inter-wave interference; employs the threshold value calculated by the conventional method and the compensation value to determine a threshold value to be used for digitizing the read signal; and digitizes the read signal based on the threshold value.

As is described above, according to the present invention, the peak value for the amplitude of the signal read from the storage medium is actually monitored, and an adequate threshold value required for the digitization of the read signal is determined. Unlike the conventional device, the device of the present invention does not, in accordance with a data bit pattern, select a compensation value for a pulse width that is defined in advance and mechanically compensate for the data bit pattern. Therefore, according to the present invention, precise digitization of signals whereby the effect of inter-wave interference can be reduced can be performed for individual read signals, and the occurrence of data bit errors can be reduced.

In addition, the circuits, the device and the method of the present invention are provided in order to reduce the effect of inter-wave interference in accordance with individual read signals, and to enable precise digitization of the signals, and can be applied not only for a DVD but also for any other type of optical disk device, such as a CD-ROM and a magneto optical disk (MO).

We claim:

1. An apparatus for digitizing a signal read from a data storage medium, comprising:

a peak detector, for detecting a peak value for an amplitude of a signal read from the storage medium;

a threshold value determiner, for employing the peak value obtained by the peak detector to determine a compensation value that is used for compensating for the effect of inter-wave interference on the signal, and for employing a calculated threshold value and the compensation value to determine a compensated threshold value; and a digitization circuit, for digitizing the signal by using the threshold value determined by the threshold value determiner; and wherein the threshold value determiner acquires a new threshold value Vth where $$Vth=Vt+DVt$$

where Vt denotes a threshold value before compensation (a current threshold value) and DVt denotes a compensation value.

2. The apparatus according to claim 1, wherein the compensation value ΔVt is $$\Delta Vt=k*(Vp-Vpp)$$

where Vp denotes a current peak value, Vpp denotes an immediately preceding peak value, and k denotes a proportional constant determined in accordance with a magnitude of inter-wave interference.

3. The apparatus according to claim 2, wherein inter-wave interference is compensated for when a modulation ratio, defined as a ratio of an amplitude of shortest data to an amplitude of longest data, is large.

4. The apparatus according to claim 1, wherein the compensation value ΔVt is $$\Delta Vt=k*(Vc-Vt)$$

where Vc denotes a middle value obtained from a peak value, and k denotes a proportional constant determined in accordance with a magnitude of inter-wave interference.

5. The apparatus according to claim 4, wherein the inter-wave interference is compensated for when a modulation ratio, defined as a ratio of the amplitude of the shortest data to the amplitude of the longest data, is small.

6. The apparatus according to claim 1, further comprising an interpolator for interpolating a value for the signal.

7. The apparatus according to claim 6, wherein the peak detector employs a sample value for the signal and an interpolation value to detect a peak value for the amplitude of the signal.

8. The apparatus according to claim 6, further comprising a delay circuit for holding the sample value for the read signal until the threshold value determiner determines a threshold value.

9. The apparatus according to claim 1, wherein the storage medium is selected from a group including a digital video disk (DVD), a magneto optical disk (MO), a compact disk (CD) and a laser disk (LD).

10. A data slicing method, for digitizing a signal read from a storage medium on which data are recorded, comprising the steps of:

detecting a peak value of an amplitude of a signal read from the storage medium;

employing the peak value to determine a compensation value, which is used for compensating for the effect on the signal of inter-wave interference;

employing the compensation value to determine a compensated threshold value; and digitizing the signal by using the determined threshold value; and wherein the threshold value is determined by $$Vth=Vt+DVt$$

where Vth denotes a new threshold value, Vt denotes a threshold value before compensation (a current threshold value) and DVt denotes a compensation value.

11. The data slicing method according to claim 10, wherein the compensation value ΔVt is $$\Delta Vt=k*(Vp-Vpp)$$

where Vp denotes a current peak value, Vpp denotes an immediately preceding peak value, and k denotes a proportional constant determined in accordance with a magnitude of inter-wave interference.

12. The data slicing method according to claim 11, wherein the inter-wave interference is compensated for when a modulation ratio, defined as a ratio of the amplitude of the shortest data to the amplitude of the longest data, is large.

13. The data slicing method according to claim 10, wherein the compensation value ΔVt is $$\Delta Vt=k*(Vc-Vt)$$

where Vc denotes a middle value obtained from a peak value, and k denotes a proportional constant determined in accordance with a magnitude of inter-wave interference.

14. The data slicing method according to claim 13, wherein the inter-wave interference is compensated for when a modulation ratio, defined as a ratio of the amplitude of the shortest data to the amplitude of the longest data, is small.

15. The data slicing method according to claim 10, further comprising a step of determining an interpolation value used to compensate for the signal read from the storage medium.

16. The data slicing method according to claim 15, wherein at the step of detecting the peak value, a sample value for the read signal and the interpolation value are employed to detect the peak value for the amplitude of the read signal.

17. The data slicing method according to claim 15, further comprising a step of holding the sample value for the read signal in a delay circuit until the threshold value is determined.

18. The data slicing method according to claim 10, wherein the storage medium is selected from a group including a digital video disk (DVD), a magneto optical disk (MO), a compact disk (CD) and a laser disk (LD).

19. An optical disk device comprising:
an optical disk;
a spindle motor for rotating the optical disk;
a rotation controller for controlling a rotation of the spindle motor;
an optical pickup for irradiating the optical disk with an optical beam and receiving a reflecting beam from the disk;
an optical pickup controller for controlling the optical pickup;
a signal processor, for processing signals acquired from the optical pickup;
a drive controller for controlling the three circuits, and for exchanging a data signal with an external device;
the signal processor, including a apparatus for digitizing a signal read from a storage medium on which data are recorded, the slice circuit including,
  a peak detector, for detecting a peak value for an amplitude of a signal read from the storage medium,
  a threshold value determiner, for employing the peak value obtained by the peak detector to determine a compensation value that is used for compensating for the effect of inter-wave interference on the signal, and for employing a calculated threshold value and the compensation value to determine a compensated threshold value, and
  a digitization circuit, for digitizing the read signal by using the threshold value determined by the threshold value determiner.

20. An optical disk device comprising:
an optical disk;
a spindle motor for rotating the optical disk;
a rotation controller for controlling a rotation of the spindle motor;
an optical pickup for irradiating the optical disk with an optical beam and reading a signal from the optical disk;
a signal processor, for processing samples of signals acquired by the optical pickup, including:
  a peak detector, for detecting a peak value for an amplitude of the samples;
  an interpolator for adjusting the peak value upward when consecutive samples fall before and after a predicted peak;
  a threshold value determiner:
    which uses a first compensation when a change in the peak value corresponds to a changed value in a threshold value used for digitization, the first compensation being $\Delta Vt$, where $$\Delta Vt = k^*(Vp - Vpp)$$

where $Vp$ denotes a current peak value, $Vpp$ denotes an immediately preceding peak value, and $k$ denotes a proportional constant determined according to a magnitude of an inter-wave interference, and
    which uses a second compensation when an amplitude for short data is detected, the second compensation value is determined in order to extend a data length, and is employed to determine the threshold value, the second compensation value is $\Delta Vt$ where $$\Delta Vt = k^*(Vc - Vt)$$

where $Vc$ denotes a middle value obtained from the peak value, $Vc$ denotes a threshold value before compensation (current threshold value), and $k$ denotes a proportional constant determined in accordance with the magnitude of the inter-wave interference.

21. The optical disk device of claim 20 further comprising a delay circuit through which the samples pass in parallel with the samples in the threshold value determiner; and a comparator which compares output from the delay circuit with output from the threshold value determiner.

* * * * *